United States Patent [19]

Wismer

[11] 3,968,016
[45] July 6, 1976

[54] MIXTURE OF UNSATURATED POLYESTER RESINS WITH AN EPOXY DIACRYLATE AND THE ACTINIC LIGHT TREATMENT OF SAME

[75] Inventor: Marco Wismer, Gibsonia, Pa.

[73] Assignee: PPG Industries, Inc., Pittsburgh, Pa.

[22] Filed: May 14, 1973

[21] Appl. No.: 360,253

Related U.S. Application Data

[63] Continuation of Ser. No. 254,060, May 17, 1972, abandoned.

[52] U.S. Cl. ................. 204/159.16; 204/159.15; 204/159.19; 260/835; 260/837 R; 427/54
[51] Int. Cl.² ........................................... C08F 8/00
[58] Field of Search ................ 260/836, 837, 835; 204/159.15, 159.19, 159.16

[56] References Cited
UNITED STATES PATENTS

| | | |
|---|---|---|
| 3,301,743 | 1/1967 | Fekete et al. .................. 260/836 |
| 3,450,613 | 6/1969 | Steinberg ....................... 204/159.15 |
| 3,506,736 | 4/1970 | Najvar ............................. 260/835 |
| 3,586,527 | 6/1971 | Aronoff et al. .................. 260/836 |
| 3,621,093 | 11/1971 | Svoboda et al. ................. 260/836 |
| 3,770,602 | 11/1973 | D'Alelio .......................... 204/159.15 |
| 3,793,398 | 2/1974 | Hokamura ....................... 260/835 |
| 3,808,114 | 4/1974 | Tsuchihara et al. ............ 204/159.16 |

*Primary Examiner*—Richard B. Turer
*Attorney, Agent, or Firm*—George D. Morris

[57] ABSTRACT

A mixture of compounds comprising an ethylenically unsaturated polyester and the reaction product of acrylic or methacrylic acid with a polyglycidyl ether of a polyalkanol or a polyphenol is subjected to actinic light to cure said mixture. The actinic light treatment may be carried out in the presence of air.

10 Claims, No Drawings

MIXTURE OF UNSATURATED POLYESTER RESINS WITH AN EPOXY DIACRYLATE AND THE ACTINIC LIGHT TREATMENT OF SAME

CROSS-REFERENCE TO RELATED APPLICATION

This application is a continuation of application Ser. No. 254,060, filed May 17, 1972 now abandoned.

BACKGROUND OF THE INVENTION

Polyester resins have enjoyed extensive use as coating materials for many substrates in recent years. The polyester resins are useful as they are capable of forming good hard films which are quite protective to the substrate on which they are used.

A major problem involving the use of polyester resin coatings had been the expense and time involved in curing the resins to a hard coating. The use of catalysts and heating in an oven is a slow and expensive process. Although the use of actinic light as a fast and inexpensive method of curing selected compositions became known, polyester resins could not be satisfactorily cured by actinic light in the presence of air. Thus the actinic light cure of polyester resins necessitated an enclosed atmosphere of inert gas such as nitrogen. Although the method was still faster than the catalytic cure, the necessity of the inert atmosphere is quite expensive.

It was found that the addition of wax to polyester resins would allow the resins to be cured by actinic light in the presence of air. This process was also a slow process, however, as the wax must be allowed to migrate to the surface during cure and the compositions respond very slowly to actinic light. Thus, slow line speeds had to be used.

It has now been discovered that wax-free polyester resin compositions may be admixed with an epoxy-based diacrylate to form a composition which cures rapidly when subjected to actinic light in the presence of air.

The polyester which is admixed with the diacrylate may be any unsaturated polyester.

The polyesters are ordinarily mixtures of a polyester of an alpha-beta ethylenically unsaturated polycarboxylic acid and a polyhydric alcohol.

The ethylenically unsaturated polycarboxylic acids include such acids as:

maleic acid
fumaric acid
aconitic acid
mesaconic acid
citraconic acid
itaconic acid
dichloromaleic acid and halo and alkyl derivatives of such acids and the like; the preferred acid being maleic acid. The anhydrides of these acids, where the anhydrides exist, are, of course, embraced under the term "acid", since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:

ethylene glycol
diethylene glycol
triethylene glycol
polyethylene glycol
propylene glycol
dipropylene glycol
polypropylene glycol
glycerol
neopentyl glycol
pentaerythritol
trimethylol propane
trimethylol ethane and the like. The preferred polyols for the purposes of this invention have a molecular weight of less than about 2000 and consist essentially of carbon, hydrogen and oxygen. The polyhydric alcohols are generaly employed in an equal molar ratio to the total acid components, or as a slight excess, as, for example, about 10 mol percent excess.

Saturated dicarboxylic acids may be utilized in combination with the unsaturated acid or anhydride in the preparation of unsaturated polyesters. Such acids increase the length of the polyester without adding additional crosslinking sites, which is a desired feature in some polyesters. Examples of useful dicarboxylic acids which are either saturated or only aromatically unsaturated include:

succinic acid
adipic acid
suberic acid
azelaic acid
sebacic acid
phthalic acid
isophthalic acid
terephthalic acid
tetrachlorophthalic acid
tetrabromophthalic acid and the like. As in the case of the ethylenically unsaturated acids, the anhydrides of these acids, where the anhydrides exit, are, of course, embraced in the term "acid", since the polyesters obtained therefrom are the same. Furthermore, the purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

A particularly preferred polyester is formed from a glycol and about 50 percent of an unsaturated acid and 50 percent of a saturated acid. An example is the polyester formed from neopentyl glycol and equimolar amounts of adipic acid and maleic anhydride.

To the polyester is added the reaction product of a member of the group consisting of acrylic acid and methacrylic acid with a polyglycidyl ether of a polyphenol or polyhydric alcohol.

The acid may be reacted with any polyglycidyl ether of a polyphenol or polyhydric alcohol. The preferred reactants are the polyglycidyl ether of a polyphenol such as Bisphenol A and acrylic acid. Other polyglycidyl ethers may be attained, for example, by etherification of a polyphenol with epichlorohydrin or dichlorohydrin in the presence of an alkali. The phenolic compound may be 2,2-bis(4-hydroxyphenyl)propane, 4,4'- dihydroxybenzophenone, 1,1-bis(4-hydroxyphenyl)ethane, 2,2-bis(4-hydroxy-tertiarybutylphenyl)propane, bis(2-hydroxy-naphthyl) methane, 1,5-dihydroxynaphthalene, or the like. The polyphenol can also be a novolak resin or a similar polyphenol resin.

Such polyglycidyl ethers of polyphenols correspond to the average formula:

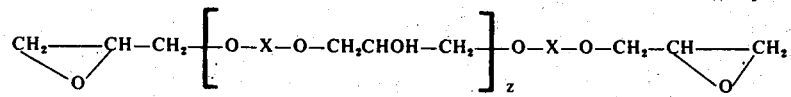

in which X represents an aromatic radical and z represents a whole or fractional small number.

Examples of this class of polyepoxides are the reaction products of Bisphenol A and epichlorohydrin, which correspond to the structure:

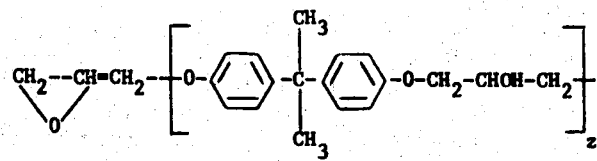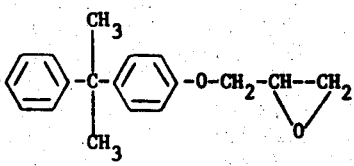

in which z represents a whole or fractional small number.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,4-butane diol, 1,5-pentanediol, 2,4,6-hexanetriol, glycerol, trimethylolpropane, and the like.

The acrylic or methacrylic acid and polyglycidyl ether are generally reacted in a temperature of from about 70°C. to about 150°C. and polymerization inhibitors such as di-tertiary butyl phenol, and the like, and catalysts such as quarternary ammonium salts, diisobutyl cresoxy ethoxy ethyl dimethyl benzyl ammonium chloride, and the like, may be used in amounts of from about 0.1% to about 5%. Any molar ratio of acid to polyglycidyl ether may generally be used as the reaction is carried out stoichiometrically. However, the molar ratio of acid to polyglycidyl ether is generally about 2:1.

Vinyl monomers which crosslink with unsaturated polyesters to form thermosetting materials may be admixed with the acrylic compounds and polyesters, if desired. Such vinyl monomers may include:
  styrene
  divinylbenzene
  methyl acrylate
  methyl methacrylate
  hexyl acrylate
  2-ethylhexyl acrylate
  octyl acrylate
  octyl methacrylate
  2-hydroxyethyl acrylate
  vinyl toluene
  p-tertiary butyl styrene
  ethylene glycol diacrylate
  vinyl acetate
  vinyl propionate
  vinyl benzoate
  allyl cyanide
  butyl vinyl ether
  cetyl vinyl ether
  diallylphthalate
  triallyl isocyanurate
  allyl acrylate
  2-methoxyethyl acrylate
and the like. The preferred vinyl monomers are liquid compounds, soluble in the polyester components. Such monomers should preferably be free of non-aromatic carbon-carbon conjugated double bonds.

The vinyl monomer as exemplified in the above lists may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer.

The amount of reaction product added to the polyester to achieve the final cure in air must be from about 10 percent to about 80 percent by weight of the polyester. At levels lower than about 10 percent, the mixture will not cure satisfactorily in the presence of air.

The vinyl aromatic content of the composition should preferably be less than 50 percent by weight based on the reactive components of the composition in order to more effectively use the lower levels of reaction product.

The coating compositions may contain photosensitizers to aid in the actinic light curing of the compositions. Various common photosensitizers are benzoin, benzoin methyl ether, diphenyl disulfide dibenzyl disulfide, benzil, benzophenone, xanthone, acetophenone, anthroquinone, and the like. Generally the coating may comprise from about 0.01 percent by weight of the photosensitizer to about 10 percent by weight of the photosensitizer.

The diacrylate and polyester and vinyl monomer (if desired) are merely mixed together to form the novel mixtures of this invention. If desired, the polyester may be heated slightly to facilitate the mixing.

The mixtures may be interpolymerized to form a film or coated onto a substrate and then interpolymerized. As these materials form strong and heat-resistant coatings, the use thereof is a preferred embodiment. The mixtures are interpolymerized by subjecting them to actinic light.

The composition comprising the diacrylate and polyester is cured into a hard, mar-free, generally stain resistant film by subjecting to actinic light. In general, the use of wave lengths in which sensitivity to actinic light occurs is approximately 1800 to 4000 Angstrom units. Various suitable sources of the actinic light are available in the art including by way of example, quartz mercury lamps, ultraviolet cored carbon arcs, and highflash lamps.

The curing operation may take place in the presence of oxygen or air and no wax need be added to the polyester. The composition may be cured at line speeds of 50 feet per minute or greater and the films formed have improved hardness, stain resistance and abrasion resistance over films formed from the polyester alone.

The novel method of this invention may be used to coat substrates with polyester by merely applying the composition to the substrate and subjecting the composition to actinic light to cure in situ.

Any conventional means of applying the composition to the substrate may be used as dip coating, roll coating, spraying and the like.

The coated substrates are quite useful for plywood paneling, cabinets, furniture, printed paper products, cement, and cement asbestos products, and the like.

The following example sets forth specific embodiments of the invention. However, the invention is not to be construed as being limited to these embodiments for there are, of course, numerous possible variations and modifications. All parts and percentages of the examples as well as throughout the specification are by weight unless otherwise indicated.

EXAMPLE 1

A container was charged with 9.25 grams of an unsaturated polyester resin formed by mixing 30 parts of styrene with 70 parts of a polyester comprising 5 moles of maleic anhydride, 5 moles of phthalic anhydride and 10.6 moles of propylene glycol with 0.01 percent by weight of methyl hydroquinone inhibitor, 7.5 grams of vinyl toluene, 2.2 grams of Triganol 14 (a mixture of the benzoin ethers of butyl and amyl alcohols) and 50 grams of the reaction product of acrylic acid and the diglycidyl ether of Bisphenol A (Epon 828) having the formula

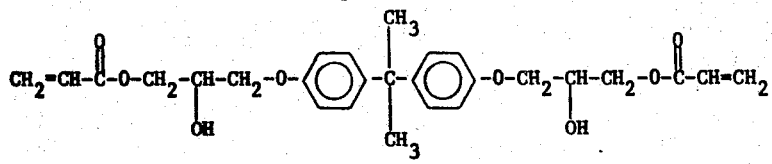

The above composition was mixed and subjected to ultraviolet light from a high intensity mercury vapor lamp (330 watts per square inch) at a line speed of 15 feet per minute for two passes in the presence of air.

The above film was compared to a film formed by mixing 98.5 grams of the polyester resin and 1.5 grams of Triganol 14 alone and subjecting to ultraviolet light from the same source for three passes at 15 feet per minute in the presence of air.

The above films were tested for solvent resistance by rubbing with a cloth soaked with acetone and mar resistance by scratching with a fingernail. The film formed using the epoxy diacrylate was not affected by 100 rubs in acetone (each rub consists of a backward and forward motion while exercising firm pressure on a solvent soaked swab) while the film formed without the epoxy diacrylate lifted after only 50 rubs. The film formed using the epoxy diacrylate was not affected by the fingernail test while the film formed without the epoxy diacrylate marred. Although a specific example of the instant invention has been set forth hereinabove, it is not intended that the invention be limited solely thereto, but to include all the variations and modifications falling within the scope of the appended claims.

I claim:

1. The method comprising subjecting, in the presence of air, a composition comprising an actinic light sensitive mixture of compounds comprising a. an ethylenically unsaturated polyester of an alpha, beta ethylenically unsaturated polycarboxylic acid and a polyhydric alcohol,
    b. from about 10 to about 80 percent by weight, based on said ethylenically unsaturated polyester, of the reaction product of a member of the group consisting of acrylic acid and methacrylic acid with a polyglycidyl ether of a polyphenol or polyhydric alcohol, and
    c. from about 0.01 to about 10 percent by weight, based on the weight of said composition, of a photosensitizer to actinic light having a wavelength in the range of from about 1800 to about 4000 Angstrom units to cure said composition and to impart thereto hardness, stain resistance and abrasion resistance.

2. The method of claim 1 wherein said composition contains at least one other interpolymerizable ethylenically unsaturated monomer.

3. The method of claim 2 wherein said other interpolymerizable ethylenically unsaturated monomer is styrene.

4. The method of claim 1 wherein said reaction product is the reaction product of acrylic acid and the polyglycidyl ether of Bisphenol A.

5. The method of coating a substrate comprising applying to a substrate a composition comprising a mixture of compounds comprising a. an ethylenically unsaturated polyester of an alpha, beta ethylenically unsaturated polycarboxylic acid and a polyhydric alcohol,
    b. from about 10 to about 80 percent by weight, based on said ethylenically unsaturated polyester, of the reaction product of a member of the group consisting of acrylic acid and methacrylic acid with a polyglycidyl ether of a polyphenol or a polyhydric alcohol, and
    c. from about 0.01 to about 10 percent by weight, based on the weight of said composition, of a photosensitizer to form a coating on said substrate, and subjecting said coating, in the presence of air, to actinic light in the wavelength range of from about 1800 to about 4000 Angstrom units to cure said coating into a hard film having stain resistance and abrasion resistance.

6. The method of claim 5 wherein the composition contains at least one other interpolymerizable ethylenically unsaturated monomer.

7. The method of claim 6 wherein said other interpolymerizable ethylenically unsaturated monomer is styrene.

8. The method of claim 5 wherein said reaction product is the reaction product of acrylic acid and the polyglycidyl ether of Bisphenol A.

9. The method of claim 1 wherein said composition is wax-free.

10. The method of claim 5 wherein said composition is wax-free.

* * * * *